(12) United States Patent
Yamashita et al.

(10) Patent No.: US 11,359,046 B2
(45) Date of Patent: Jun. 14, 2022

(54) POLYURETHANE COMPOSITION

(71) Applicant: Sunstar Engineering Inc., Osaka (JP)

(72) Inventors: Kiichi Yamashita, Osaka (JP); Tatsuya Wakamori, Osaka (JP)

(73) Assignee: Sunstar Engineering Inc., Osaka (JP)

(*) Notice: Subject to any disclaimer, the term of this patent is extended or adjusted under 35 U.S.C. 154(b) by 125 days.

(21) Appl. No.: 16/019,725

(22) Filed: Jun. 27, 2018

(65) Prior Publication Data
US 2019/0002622 A1 Jan. 3, 2019

(30) Foreign Application Priority Data
Jun. 28, 2017 (JP) .............................. JP2017-126149

(51) Int. Cl.
| | | |
|---|---|---|
| C08G 18/32 | (2006.01) | |
| C08G 18/38 | (2006.01) | |
| C08G 18/48 | (2006.01) | |
| C08G 18/50 | (2006.01) | |
| C08G 18/58 | (2006.01) | |
| C08G 18/64 | (2006.01) | |
| C08G 18/66 | (2006.01) | |
| C08G 18/76 | (2006.01) | |
| C08J 9/12 | (2006.01) | |

(52) U.S. Cl.
CPC .......... *C08G 18/48* (2013.01); *C08G 18/329* (2013.01); *C08G 18/3228* (2013.01); *C08G 18/3287* (2013.01); *C08G 18/3821* (2013.01); *C08G 18/4829* (2013.01); *C08G 18/643* (2013.01); *C08G 18/76* (2013.01); *C08G 18/7664* (2013.01); *C08J 9/125* (2013.01); C08G 2110/0058 (2021.01); C08G 2110/0066 (2021.01); C08G 2110/0083 (2021.01); C08G 2350/00 (2013.01); C08J 2375/12 (2013.01)

(58) Field of Classification Search
CPC ............ C08G 18/3228; C08G 18/3287; C08G 18/329; C08G 18/4804; C08J 2375/08
See application file for complete search history.

(56) References Cited

U.S. PATENT DOCUMENTS

| | | | | |
|---|---|---|---|---|
| 5,541,338 A | * | 7/1996 | Dewhurst ............ | C07D 233/56 548/313.7 |
| 6,337,355 B1 | * | 1/2002 | Yamashita ............ | B29C 31/041 428/314.4 |
| 2005/0148677 A1 | * | 7/2005 | Elsken ................ | C08G 18/4018 521/155 |
| 2007/0259981 A1 | * | 11/2007 | Eling ................. | C08G 18/4804 521/99 |
| 2008/0058436 A1 | * | 3/2008 | Mautino ............ | C08G 18/5024 521/131 |
| 2008/0058468 A1 | * | 3/2008 | Younes ................. | C08J 9/0085 524/589 |
| 2010/0036010 A1 | * | 2/2010 | Morley ................ | C08G 18/482 521/167 |
| 2011/0077315 A1 | | 3/2011 | Morley et al. | |
| 2012/0022179 A1 | * | 1/2012 | Emge .................... | C08G 18/482 521/174 |
| 2012/0172470 A1 | * | 7/2012 | Morley .............. | C08G 18/4829 521/114 |
| 2012/0232180 A1 | * | 9/2012 | Kunst ................ | C08G 18/1808 521/167 |
| 2012/0244303 A1 | * | 9/2012 | Tomasi .............. | C08G 18/6607 428/36.5 |
| 2012/0259030 A1 | * | 10/2012 | Kunst ................ | C08G 18/1808 521/164 |
| 2013/0046037 A1 | * | 2/2013 | Emge .................... | C08G 18/61 521/112 |
| 2014/0010981 A1 | * | 1/2014 | Grieser-Schmitz .... | C08G 18/72 428/36.5 |
| 2016/0145374 A1 | * | 5/2016 | Ishikawa ............ | C08G 18/1808 521/129 |
| 2016/0326330 A1 | * | 11/2016 | Schuette ................ | C08G 18/14 |
| 2016/0369077 A1 | * | 12/2016 | Hu ...................... | C08G 18/4018 |
| 2016/0376397 A1 | * | 12/2016 | Dedecker ................. | C08J 9/146 521/131 |
| 2018/0327563 A1 | * | 11/2018 | Klostermann ......... | C08J 9/0095 |
| 2019/0322790 A1 | * | 10/2019 | Rider ................. | C08G 18/7664 |

FOREIGN PATENT DOCUMENTS

| | | |
|---|---|---|
| CN | 101044180 A | 9/2007 |
| CN | 102112513 A | 6/2011 |
| CN | 102666627 A | 9/2012 |
| JP | 10-212332 | 8/1998 |
| JP | 11-105057 | 4/1999 |
| JP | 2001-278938 A | 10/2001 |
| JP | 2004-244508 | 9/2004 |

OTHER PUBLICATIONS

Office Action relating to Japanese Application No. 2017-126149, dated Nov. 17, 2020.
Office Action relating to Chinese patent Application No. 201810661471. 5, dated May 6, 2021.

* cited by examiner

*Primary Examiner* — Melissa A Rioja
(74) *Attorney, Agent, or Firm* — Meunier Carlin & Curfman LLC

(57) ABSTRACT

An object of the present invention is to provide a polyurethane composition, in which reduction in the strength of the foam is suppressed when the foam has been greatly deformed. The present invention relates to a polyurethane composition comprising a base resin and a curing agent, wherein the base resin comprises a compound (A-1) comprising a polyalkylene skeleton comprising neither an aromatic skeleton nor an alicyclic skeleton, and having two or more functional groups having an active hydrogen atom, a compound (A-2) comprising an aromatic skeleton and/or alicyclic skeleton, and having two or more functional groups having an active hydrogen atom, a blowing agent (B), and an amine-based catalyst (C); a polyurethane foam therefrom; and a method for soundproofing and reinforcing a vehicle.

12 Claims, 1 Drawing Sheet

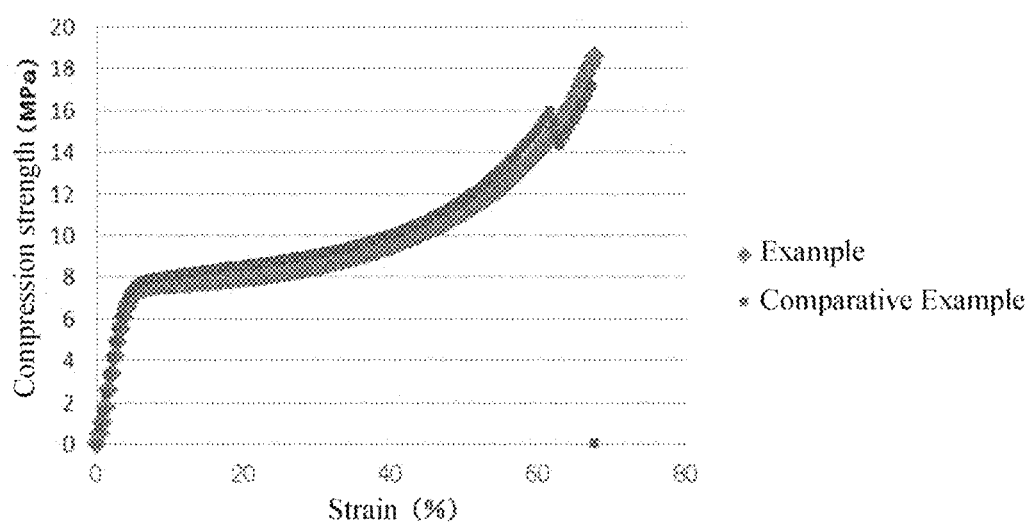

POLYURETHANE COMPOSITION

BACKGROUND OF THE INVENTION

Field of the Invention

This patent application claims priority under the Paris Convention based on Japanese Patent Application No. 2017-126149 (filed on Jun. 28, 2017), which is incorporated herein by reference in their entirety.

The present invention relates to a polyurethane composition, a polyurethane foam therefrom, and a method for soundproofing and reinforcing a vehicle.

Description of the Related Art

To reinforce a closed cross section of a body of a vehicle, a method for filling the inside of a closed cross section of the body with an organic foam has hitherto been used.

Patent Document 1 has proposed a method for foaming a two-component foamable urethane material utilizing not water or chlorofluorocarbon, but heat production by a reaction of two components.

Patent Document 2 has proposed a method for filling a two-component foamable urethane material into every part of a material to be filled, by controlling the curing behavior of the urethane material.

Patent Document 3 has proposed a method for reinforcing a vehicle body by applying to a steel plate a polyolefin-based reinforcing material composition containing heat-expandable fine spheres, and heating and curing the composition.

PRIOR ART DOCUMENTS

Patent Documents

Patent Document 1: JP-A-11-105057
Patent Document 2: JP-A-10-212332
Patent Document 3: JP-A-2004-244508

SUMMARY OF THE INVENTION

In the two-component foamable urethane materials described in Patent Documents 1 and 2 and the reinforcing material composition described in Patent Document 3, the strength of foam is reduced in some cases, when the foam has been greatly deformed. Thus, an object of the present invention is to provide a polyurethane composition, in which reduction in the strength of the foam is suppressed when the foam has been greatly deformed.

The present inventors made an analysis on suppression of reduction in the strength at the time of great deformation, in a polyurethane foam, and found out that compatibility between polyoxyalkylene polyol in a base resin of the polyurethane composition and crude MDI as a curing agent is low, and consequently, reduction in the strength of the foam when the foam has been greatly deformed is caused.

The present inventors also found out that when as an active hydrogen atom-containing component of a base resin, an aromatic skeleton and/or alicyclic skeleton compound having two or more functional groups having an active hydrogen atom are (is) used, compatibility with an aromatic isocyanate that is a curing agent component is improved, the cell size at the time of foaming is finely and uniformly maintained, and reduction in the strength of the foam at the time of great deformation can be suppressed. Furthermore, the present inventors found out that by using a compound obtained by a reaction at a mixing equivalent ratio of an epoxy group to a diamine of 4 or more, and/or a compound obtained by a reaction at the ratio of less than 1, as a compound containing an aromatic skeleton and/or alicyclic skeleton, and having two or more functional groups having an active hydrogen atom, reduction in the compatibility can be suppressed, due to possession of an aromatic skeleton or alicyclic skeleton by every compound.

That is, the present invention includes the following preferable aspects:

[1] A polyurethane composition comprising a base resin and a curing agent, wherein the base resin comprises a compound (A-1) comprising a polyalkylene skeleton comprising neither an aromatic skeleton nor an alicyclic skeleton, and having two or more functional groups having an active hydrogen atom, a compound (A-2) comprising an aromatic skeleton and/or alicyclic skeleton, and having two or more functional groups having an active hydrogen atom, a blowing agent (B), and an amine-based catalyst (C).
[2] The polyurethane composition according to [1], wherein a content of the compound (A-2) in the base resin is 3 to 50% by mass based on the total mass of the base resin.
[3] The polyurethane composition according to [1] or [2], wherein the active hydrogen atom in the compound (A-1) is a hydrogen atom derived from a hydroxyl group.
[4] The polyurethane composition according to any one of [1] to [3], wherein the active hydrogen atom in the compound (A-2) is an active hydrogen atom derived from a diamine compound having an aromatic skeleton or alicyclic skeleton.
[5] The polyurethane composition according to [4], wherein the compound (A-2) further comprises a structural unit derived from an epoxy group.
[6] The polyurethane composition according to [4] or [5], wherein in the compound (A-2), a ratio of the structural unit derived from an epoxy group to a structural unit derived from the diamine compound having an aromatic skeleton or alicyclic skeleton is 0 to 0.8, or 4 or more.
[7] The polyurethane composition according to any one of [1] to [6], wherein the blowing agent (B) is water, and a content of the blowing agent (B) in the base resin is 0.1 to 2% by mass based on the total mass of the base resin.
[8] The polyurethane composition according to any one of [1] to [7], wherein the curing agent contains an aromatic polyisocyanate.
[9] A polyurethane foam comprising a cured product of the polyurethane composition as defined in any one of [1] to [8].
[10] The polyurethane foam according to [9], wherein a density of the polyurethane foam is 80 to 400 kg/m$^3$.
[11] A method for reinforcing and soundproofing a vehicle, comprising a step of injecting the polyurethane composition as defined in any one of [1] to [8] into an inside of a closed cross section of a body member with a high pressure foaming machine, and forming a polyurethane foam inside the closed cross section of the body member.
[12] A body member comprising the polyurethane foam as defined in [9] or [10], the polyurethane foam being arranged inside the closed cross section of the body member.
[13] A vehicle comprising the body member as defined in [12].

In the polyurethane composition of the present invention, reduction in the strength when the foam has been greatly deformed is suppressed. To secure stable physical properties of the foam, a silicone-based foam stabilizer is used in some cases for the purpose of making the cell size of the foam fine and uniform, but since the silicone-based foam stabilizer has the nature to repel paint, there is a tendency that use thereof is avoided in an automobile coating line. However, according to the polyurethane composition of the present invention, a polyurethane foam in which the cell size is finely and uniformly maintained is obtained, regardless of the silicone-based foam stabilizer. Accordingly, the polyurethane composition can be suitably used to reinforce and soundproof a body member of a vehicle.

BRIEF DESCRIPTION OF THE DRAWINGS

FIG. 1 shows each compression strength curve obtained by a compression test in Example 1 and Comparative Example 1.

DETAILED DESCRIPTION OF THE INVENTION

The polyurethane composition of the present invention is a two-component polyurethane composition comprising a base resin and a curing agent.

The base resin comprises a compound (A-1) having a polyalkylene skeleton comprising neither an aromatic skeleton nor an alicyclic skeleton, and two or more functional groups having an active hydrogen atom (hereinafter, also referred to as Compound (A-1)), a compound (A-2) having an aromatic skeleton and/or alicyclic skeleton, and two or more functional groups having an active hydrogen atom (hereinafter, also referred to as Compound (A-2)), a blowing agent (B), and an amine-based catalyst (C).

The content of Compound (A-1) in the base resin is preferably 50 to 96% by mass, more preferably 60 to 95% by mass, further preferably 70 to 94% by mass, and particularly preferably 80 to 93% by mass, based on the mass of the base resin. When the content of Compound (A-1) in the base resin is within the range, the viscosity of the base resin can be designed to be low, and facility adaptability tends to become good.

The content of Compound (A-2) in the base resin is preferably 3 to 50% by mass, more preferably 3.5 to 40% by mass, further preferably 4 to 30% by mass, and particularly preferably 4.5 to 20% by mass, based on the mass of the base resin. When the content of Compound (A-2) in the base resin is within the range, since the viscosity does not become too high, workability is excellent, and compatibility with the curing agent becomes sufficient, and thus, there is a tendency that reduction in the compression strength at the time of great deformation is suppressed.

As the polyalkylene skeleton comprising neither an aromatic skeleton nor an alicyclic skeleton in Compound (A-1), a polyalkylene skeleton derived from a ring-opening polymerization product of alkylene oxide is preferable.

Examples of the active hydrogen atom in Compound (A-1) include a hydrogen atom derived from a hydroxyl group, a carboxyl group, an amino group, an imino group or a thiol group. Inter alia, preferred is a hydrogen atom derived from a hydroxyl group. Compound (A-1) has two or more, preferably three or more active hydrogen atoms.

As Compound (A-1), a polyether polyol obtained, for example, by addition reaction of one or two or more of alkylene oxides, for example, ethylene oxide, propylene oxide, butylene oxide, and isobutylene oxide to an active hydrogen-containing compound such as an aliphatic alcohol and an aliphatic amine is preferable.

Examples of the aliphatic alcohol include dihydric alcohols such as ethylene glycol, diethylene glycol, propylene glycol, dipropylene glycol, butanediol, pentanediol, hexanediol, neopentyl glycol, and cyclohexylene glycol; trihydric alcohols such as trimethylolpropane and glycerin; tetra- or more-hydric alcohols such as pentaerythritol, sorbitol, methyl glycoside, diglycerin, and sucrose.

Examples of the aliphatic amine include ammonia, monoethanolamine, diethanolamine, triethanolamine, polymethylenediamine (ethylenediamine, diaminobutane, diaminopropane, hexanediamine, dodecanediamine etc.), polyethylenepolyamine (diethylenetriamine, triethylenetetramine etc.), and polyether diamine.

Examples of the polyether polyol which can be used as Compound (A-1) include a polypropylene polyol in which propylene oxide was added using glycerin as an initiator.

A number average molecular weight (Mn) of Compound (A-1) is preferably 100 to 3000, more preferably 150 to 1000, and further preferably 300 to 800. When a number average molecular weight of Compound (A-1) is within the range, there is a tendency that the foam easily becomes good in rigidity and flexibility. A number average molecular weight (Mn) in the present invention is a value in terms of polystyrene, measured by gel permeation chromatography (GPC).

As Compound (A-1), a compound obtained by addition reaction between the aliphatic alcohol or aliphatic amine, and an alkylene oxide may be used, or a commercially available product may be used. Examples of a representative commercially available product of Compound (A-1) include Sannix GP-400 manufactured by Sanyo Chemical Industries, Ltd.

The active hydrogen atom in Compound (A-2) is a hydrogen atom derived from the diamine compound having an aromatic skeleton or alicyclic skeleton. Compound (A-2) has two or more, preferably three or more, more preferably four or more active hydrogen atoms.

Examples of the diamine compound having an aromatic skeleton or alicyclic skeleton include aromatic diamines, alicyclic diamines, and aliphatic diamines having an aromatic ring.

Examples of the aromatic diamine include 2,4- or 2,6-diaminotoluene (TDA), crude TDA, 1,2-, 1,3- or 1,4-phenylenediamine, diethyltolylenediamine, 4,4'-diaminodiphenylmethane (MDA), crude MDA, 1,5-nap hthylenediamine, 3,3'-dichloro-4,4'-diaminodiphenylmethane, and 3,3'-dimethyl-4,4'-diaminodiphenylcyclohexane.

Examples of the aliphatic diamine having an aromatic ring include 1,2-, 1,3- or 1,4-xylenediamine (XDA).

Examples of the alicyclic diamine include 4,4'-diaminodicyclohexylmethane, 3,3'-dimethyl-4,4'-diaminodicyclohexylmethane, 3-amino-1-cyclohexylaminopropane, bis(aminomethyl)cyclohexane, isophoronediamine (IPDA), norbornanediamine, menthenediamine, and 3,9-bis(3-aminopropyl)-2,4,8,10-tetraoxaspiro(-5,5-)undecane.

It is preferable that Compound (A-2) comprises at least a structural unit derived from a diamine compound having an aromatic skeleton or alicyclic skeleton. Compound (A-2) can further comprise a structural unit derived from an epoxy group, in addition to the structural unit derived from a diamine compound having an aromatic skeleton or alicyclic skeleton. Thus, in Compound (A-2), a ratio of the structural unit derived from an epoxy group to the structural unit derived from a diamine compound having an aromatic skeleton or alicyclic skeleton may be 0 or more, and is preferably 0 to 0.8, or 4 or more, and more preferably 0 to 0.8, or 4 to 20. Compound (A-2) can be used alone, or two or more kinds of Compound (A-2) can be used by combining them.

Examples of the diamine compound having an aromatic skeleton or alicyclic skeleton include aromatic diamines, alicyclic diamines, and aliphatic diamines having an aromatic ring.

Compound (A-2) in which a ratio of the structural unit derived from an epoxy group to the structural unit derived from a diamine compound having an aromatic skeleton or alicyclic skeleton is 0 to 0.8 (deficient) may be composed of a diamine compound having an aromatic skeleton or alicyclic skeleton, and optionally, a compound having two or more epoxy groups in one molecule. When the ratio of the structural unit is 0 to 0.8, conversion into high molecular weight by a reaction between an amino group and an epoxy group is suppressed in a reaction between the diamine compound having an aromatic skeleton or alicyclic skeleton, and the compound having two or more epoxy groups in one molecule, being preferable.

Compound (A-2) in which a ratio of the structural unit derived from an epoxy group to the structural unit derived from a diamine compound having an aromatic skeleton or alicyclic skeleton is 0 to 0.8 (deficient) may be composed of a diamine compound having an aromatic skeleton or alicyclic skeleton, and a compound having one epoxy group in one molecule, and may be used together with a compound having two epoxy groups in one molecule. When the diamine compound having an aromatic skeleton or alicyclic skeleton, and the compound having one epoxy group in one molecule are used concurrently, conversion into high molecular weight of the resulting Compound (A-2) is suppressed, and there is a tendency that the viscosity is easily reduced.

Examples of the compound having two or more epoxy groups in one molecule include a bisphenol A-type epoxy resin, a bisphenol F-type epoxy resin, a bisphenol AD-type epoxy resin, and phenyl diglycidyl ether. Inter alia, a bisphenol A-type epoxy resin is more preferable. Examples of the compound having one epoxy group in one molecule include t-butylphenyl glycidyl ether, nonylphenyl glycidyl ether, phenyl glycidyl ether, and an alkylene oxide, for example, ethylene oxide, propylene oxide, butylene oxide, and isobutylene oxide. These may be used alone, or by combining them.

Examples of Compound (A-2) in which a ratio of the structural unit derived from an epoxy group to the structural unit derived from a diamine compound having an aromatic skeleton or alicyclic skeleton is 0 to 0.8 (deficient) include the aromatic diamines, alicyclic diamines, and aliphatic diamines having an aromatic ring, exemplified in the explanation regarding the compound from which an active hydrogen atom of Compound (A-2) is derived, as well as a reaction product of 1,3-xylenediamine (m-XDA) and a bisphenol A-type epoxy resin, and a reaction product of isophoronediamine (IPDA) and a bisphenol A-type epoxy resin.

Compound (A-2) in which a ratio of the structural unit derived from an epoxy group to the structural unit derived from a diamine compound having an aromatic skeleton or alicyclic skeleton is 4 or more (excessive) is obtained by addition-polymerizing a compound having one epoxy group in one molecule and a diamine compound having an aromatic skeleton or alicyclic skeleton, so that the number of epoxy groups is 4 or more, preferably 4 to 20 to one diamine compound. Examples of the compound having one epoxy group in one molecule, which can be used in this case, include t-butylphenyl glycidyl ether, nonylphenyl glycidyl ether, and phenyl glycidyl ether, and an alkylene oxide, for example, ethylene oxide, propylene oxide, butylene oxide, and isobutylene oxide. Inter alia, propylene oxide and/or ethylene oxide are (is) preferable. Examples of Compound (A-2) in which a ratio of the structural unit derived from an epoxy group to the structural unit derived from a diamine compound having an aromatic skeleton or alicyclic skeleton is 4 or more (excessive) include aromatic amine-based polyether polyols. Examples of a representative commercially available product of the aromatic amine-based polyether polyol include Multranol 4063 manufactured by Covestro company.

In Compound (A-2) in which a ratio of the structural unit derived from an epoxy group to the structural unit derived from a diamine compound having an aromatic skeleton or alicyclic skeleton is 4 or more (excessive), the ratio of the structural unit is preferably 4 to 20, more preferably 5 to 16, and further preferably 6 to 12.

Examples of the blowing agent (B) include water, and a thermal decomposable chemical blowing agent. Inter alia, water is preferable.

Examples of the thermal decomposable chemical blowing agent include dinitrosopentamethylenetetramine (DPT), azodicarbodiamide (ADCA), p,p'-oxybisbenzenesulfonylhydrazide (OBSH), p-toluenesulfonylhydrazide (TSH), p-toluenesulfonylacetone hydrazone, hydrazodicarbonamide, and azobisisobutyronitrile (AIBN). In addition to these thermal decomposable chemical blowing agents, a urea-based or metal-based aid can also be used concurrently.

The content of the blowing agent (B) in the base resin is preferably 0.1 to 2% by mass, and more preferably 0.15 to 1% by mass, based on the total mass of the base resin.

Examples of the amine-based catalyst (C) include triethylenediamine, pentamethylenediethyltetramine, N-ethylmorpholine, diethylethanolamine, 1,8-diazabicyclo(5.4.0)undecene-7, bis-(2-dimethylaminoethyl)-ether, pentamethyldiethylenediamine, dimethylaminoethoxyethanol, and trimethylaminoethylethanolamine. An amount of the catalyst is usually suitably 0.0001 to 5% by mass, based on the total mass of the base resin.

The base resin may contain additive components such as normal foam stabilizers, coloring agents (dyes, pigments), plasticizers, fillers, flame retardants, anti-aging agents, and antioxidants in an appropriate amount range.

As the curing agent, a polyisocyanate compound is preferable. Examples of the polyisocyanate compound include aromatic polyisocyanates; aliphatic or alicyclic polyisocyanates; araliphatic polyisocyanates; modified products thereof (polyol-added modified products such as trimethylolpropane, castor oil, and sucrose, carbodiimide-modified products, allophanate-modified products, urea-modified products, biuret-modified products, isocyanurate-modified products, oxazolidone-modified products etc.), and terminal NCO group-containing urethane prepolymers obtained by a reaction between polyols and excessive polyisocyanate compounds.

Examples of the aromatic polyisocyanate include 1,3- or 1,4-phenylene diisocyanate, 2,4- and/or 2,6-tolylene diisocyanate (TDI), crude TDI, diphenylmethane-2,4'- and/or -4,4'-diisocyanate (MDI), polymethylene polyphenyl isocyanate (crude MDI), naphthylene-1,5-diisocyanate, and triphenylmethane-4,4',4''-triisocyanate.

Examples of the aliphatic or alicyclic polyisocyanate include isophorone diisocyanate, 1,6-hexamethylene diisocyanate, 4,4'-dicyclohexylmethane diisocyanate, 1,4-cyclohexylene diisocyanate, and 2,2,4-trimethylhexamethylene diisocyanate.

Examples of the araliphatic polyisocyanate include xylylene diisocyanate, and tetramethylxylylene diisocyanate.

The polyisocyanate compound is preferably an aromatic polyisocyanate, more preferably MDI, crude MDI, sucrose-modified TDI, and carbodiimide-modified MDI, and further preferably crude MDI.

The curing agent may also contain additive components such as normal foam stabilizers, coloring agents (dyes, pigments), plasticizers, fillers, flame retardants, anti-aging agents, and antioxidants in an appropriate amount range.

A reaction ratio between the base resin and the curing agent in the polyurethane composition of the present invention can be variously varied, and usually, the reaction ratio may be selected so that an equivalent ratio of active hydrogen of the base resin and a NCO group of the curing agent is in a range of 1:0.7 to 5, preferably 1:0.8 to 2, and further preferably 1:0.9 to 1.5.

The polyurethane foam of the present invention includes a cured product of the polyurethane composition. As a method for producing the polyurethane foam, first, a predetermined blowing agent and catalyst, and optionally, an additive are added to Compounds (A-1) and (A-2) of the base resin, and the materials are mixed. Next, using a polyurethane foaming machine, this mixture and a curing agent are continuously mixed rapidly at a certain ratio, the mixture is immediately injected into (applied to) a predetermined part, and is foamed and cured, thereby, a polyurethane foam can be formed. A foaming ratio of the polyurethane foam may be in a range of 2.5 to 10 times. A density of the polyurethane foam may be 80 to 400 kg/m$^3$.

The polyurethane foam of the present invention can be suitably used to reinforce and soundproof a body member of a vehicle, because reduction in the strength is suppressed at the time of great deformation.

The method for reinforcing and soundproofing a body member of a vehicle of the present invention comprises a step of injecting the polyurethane composition of the present invention into the inside of a closed cross section of a body member with a high pressure foaming machine, and forming a polyurethane foam inside the closed cross section of the body member. The high pressure foaming machine is not particularly limited, but the high pressure foaming machines, which have previously been used, can be used.

Since in the body member of the present invention, the polyurethane foam of the present invention is arranged inside a closed cross section thereof, the body member of the present invention can be suitably used in a belt anchor of a seatbelt device, a center pillar, a front pillar, a roof part, and a locker part.

The present invention will be illustrated in detail below by way of examples, but the present invention is not limited to them.

EXAMPLES

[Density and Foaming Ratio]

A polyurethane composition of each of examples and comparative examples was discharged into 1-liter Polycup with a high pressure foaming machine so that a volume after foaming became 400 to 800 cc. The produced polyurethane foam was cured, and cooled. After that, a density of each polyurethane foam was obtained in accordance with a water displacement method. A ratio of a volume of each of the resulting polyurethane foams to that of each polyurethane composition was defined as foaming ratio.

[Compression Test]

The compression yield strength of a foam obtained from each polyurethane composition was measured. A sample used in a compression test was prepared as follows: an appropriate amount of the polyurethane composition of each of examples and comparative examples was filled into a 33-mmϕ PP tube stood in a vertical direction, using a high pressure foaming machine, so that the height became around 150 mm. The produced polyurethane foam was cured and cooled. After that, each polyurethane foam was taken out from the PP tube, and cut into the length of 25 mm, except for 25 mm from a lower part. Four cut pieces from the bottom were used as a test piece, in measurement.

The compression test was performed at the conditions of under the 20° C. atmosphere at a tensile speed of 10 mm/min, using an Instron-type tensile/compression testing machine, in accordance with JIS K-7220.

[Presence or Absence of Level Difference in Chart]

Whether or not reduction in the strength at the time of great deformation is suppressed was assessed as follows: when the foam is subjected to the compression test, an air space in the foam is first crushed, and the air space finally disappears, after that, the strength is rapidly increased, and a material itself starts to collapse. From this, in the present invention, concerning whether or not a side wall of the material is broken at a stage of 92% compression of the air space, whether or not a level difference is generated in a compression strength curve at 92% compression or less of the air space, in a chart obtained by the compression test, was accessed.

For the level difference, when the strength was reduced by 7% or more from the strength before reduction in the strength, it was regarded that a level difference was generated.

92% compression of the air space was defined as the air content of the foam (=volume of polyurethane composition/foaming ratio) of 92%.

⊙: At 93% compression or less of the air space, a level difference is not generated in a compression strength curve.

○: At 92% compression or less of the air space, a level difference is not generated in a compression strength curve.

x: At 92% compression or less of the air space, a level difference is generated in a compression strength curve.

FIG. 1 shows the results of the compression strength in Example 1 and Comparative Example 1. As shown in FIG. 1, it is seen that in Comparative Example 1, a level difference was generated in a compression strength curve.

Examples 1 to 8 and Comparative Examples 1 to 5

By mixing each component at parts by mass shown in Table 1, base resins were obtained. Each of the resulting base resins and a curing agent were mixed so that an equivalent ratio of active hydrogen in the base resin and a NCO group in the curing agent became 1:1.1 to 1.4 (1:1 as expressed by volume ratio), thereby, polyurethane foams were obtained. Concerning each polyurethane foam, a performance test was conducted. The results are shown in Table 2.

TABLE 1

|  | Example | | | | | | | | | Comparative Example | | | |
|---|---|---|---|---|---|---|---|---|---|---|---|---|---|
|  | 1 | 2 | 3 | 4 | 5 | 6 | 7 | 8 | 9 | 1 | 2 | 3 | 4 |
| Base resin | | | | | | | | | | | | | |
| Compound A-1-1 | 90 | 95 | 85 | 92 | 85 | 50 | 82 | 82 | 90 | 100 | 90 | 85 | 20 |
| Compound A-1-2 | — | — | — | — | — | — | — | — | — | — | 10 | 5 | 80 |
| Compound A-2-1 | 10 | — | — | — | 10 | — | 10 | 10 | 10 | — | — | — | — |
| Compound A-2-2 | — | 5 | 15 | — | — | 45 | — | — | — | — | — | — | — |
| Compound A-2-3 | — | — | — | — | 5 | 5 | — | — | — | — | — | — | — |
| Compound A-2-4 | — | — | — | — | — | — | — | 8 | — | — | — | — | — |
| Compound A-2-5 | — | — | — | 8 | — | — | 8 | — | — | — | — | — | — |
| Compound A-2-6 | — | — | — | — | — | — | — | — | — | — | — | 8 | — |
| Amine-based catalyst | 2 | 2 | 2 | 2 | 2 | 2 | 2 | 2 | 2 | 2 | 2 | 2 | 2 |
| Blowing agent | 0.22 | 0.22 | 0.22 | 0.22 | 0.22 | 0.22 | 0.22 | 0.36 | 0.9 | 0.22 | 0.22 | 0.22 | 0.22 |
| Curing agent | 120 | 120 | 120 | 120 | 120 | 120 | 120 | 120 | 120 | 120 | 120 | 120 | 120 |

Unit: gram

[Compound A-1-1]
Sannix GP-400 manufactured by Sanyo Chemical Industries, Ltd., polypropylene polyol having a molecular weight of 400 and the number of functional groups of 3, in which propylene oxide was added using glycerin as an initiator

[Compound A-1-2]
ED-450 manufactured by Asahi Glass Co., Ltd., a polyol having the hydroxyl value of 450 mg KOH/g and the number of functional groups of 4, in which propylene oxide was added using ethylene diamine as an initiator, and the ratio of a structural unit derived from an epoxy group to a structural unit derived from a diamine of about 8

[Compound A-2-1]
MULTRANOL 4063 manufactured by Covestro company, aromatic amine-based polyether polyol, having the number of functional groups of 4, OH value of 460 mg KOH/g, the molecular weight of 488, the viscosity of 18000 mPa·s (25° C.), and the ratio of a structural unit derived from an epoxy group to a structural unit derived from a diamine of about 8

[Compound A-2-2]
Polyether polyol in which propylene oxide was added using toluenediamine as an initiator, having the number of functional groups of 4, OH value of 455 mg KOH/g, the molecular weight of 470, and the ratio of a structural unit derived from an epoxy group to a structural unit derived from a diamine: 6

[Compound A-2-3]
Isophoronediamine (IPDA)

[Compound A-2-4]
Reaction product of m-XDA (manufactured by MITSUBISHI GAS CHEMICAL COMPANY, INC., 1,3-xylenediamine) and DER331 (manufactured by Dow Chemical company, bisphenol A-type epoxy resin) (weight ratio 85:15, the ratio of a structural unit derived from epoxy group to a structural unit derived from diamine of 0.13

[Compound A-2-5]
Reaction product of IPDA (isophoronediamine), DER331 (manufactured by Dow Chemical company, bisphenol A-type epoxy resin), and phenyl glycidyl ether (weight ratio 60:20:20, the ratio of a structural unit derived from epoxy group to a structural unit derived from diamine of 0.6)

[Compound A-2-6]
Hexamethylenediamine

[Amine-Based Catalyst]
ZF20 manufactured by Huntsman Corporation, bis(2-dimethylaminoethyl) ether

[Blowing Agent]
Water

[Curing Agent]
Crude MDI (Sumidur 44v-20)

TABLE 2

|  | Example | | | | | | | | | Comparative Example | | | |
|---|---|---|---|---|---|---|---|---|---|---|---|---|---|
|  | 1 | 2 | 3 | 4 | 5 | 6 | 7 | 8 | 9 | 1 | 2 | 3 | 4 |
| Density (kg/m$^3$) | 340 | 330 | 345 | 345 | 350 | 335 | 340 | 220 | 110 | 330 | 355 | 350 | *1 |
| Foaming ratio | 3.35 | 3.45 | 3.30 | 3.30 | 326 | 3.23 | 3.35 | 5.18 | 10.4 | 3.45 | 3.21 | 3.26 | — |
| Compression yield strength (MPa) | 7.8 | 7.6 | 7.8 | 7.8 | 7.9 | 7.7 | 7.8 | 4.2 | 1.2 | 7.6 | 7.9 | 7.7 | — |
| Level difference in chart | ⊙ | ⊙ | ⊙ | ○ | ○ | ○ | ⊙ | ⊙ | ⊙ | X | X | X | — |

*1 Not implemented duet to impossible mixing.

What is claimed is:

1. A polyurethane composition comprising a base resin composition and a curing agent, wherein the base resin composition comprises a compound (A-1) comprising a polyalkylene skeleton comprising neither an aromatic skeleton nor an alicyclic skeleton, and having two or more functional groups independently selected from a hydroxyl group, a carboxyl group, an amino group, an imino group or a thiol group; at least two different compounds (A-2), each comprising structural units derived from a diamine compound having an aromatic skeleton and/or alicyclic skeleton and structural units derived from an epoxy group; a blowing agent (B); and an amine-based catalyst (C); wherein in each of the at least two different compounds (A-2), a ratio of a number of the structural units derived from the epoxy group to a number of the structural units derived from the diamine compound having the aromatic skeleton or alicyclic skeleton is less than or equal to 0.8, or 5 to 20.

2. The polyurethane composition according to claim 1, wherein a content of the at least two different compounds (A-2) in the base resin composition is 3 to 50% by mass based on the total mass of the base resin composition.

3. The polyurethane composition according to claim 1, wherein at least one functional group in the compound (A-1) is a hydroxyl group.

4. The polyurethane composition according to claim 1, wherein the blowing agent (B) is water, and a content of the blowing agent (B) in the base resin composition is 0.1 to 2% by mass based on the total mass of the base resin composition.

5. The polyurethane composition according to claim 1, wherein the curing agent contains an aromatic polyisocyanate.

6. A polyurethane foam comprising a cured product of the polyurethane composition as defined in claim 1.

7. The polyurethane foam according to claim 6, wherein a density of the polyurethane foam is 80 to 400 kg/m$^3$.

8. A method for reinforcing and soundproofing a vehicle, comprising a step of injecting the polyurethane composition as defined in claim 1 into an inside of a closed cross section of a body member with a high pressure foaming machine, and forming a polyurethane foam inside the closed cross section of the body member.

9. A body member comprising the polyurethane foam as defined in claim 6, the polyurethane foam being arranged inside the closed cross section of the body member.

10. A vehicle comprising the body member as defined in claim 9.

11. The polyurethane composition according to claim 1, wherein in each of the at least two different compounds (A-2), the ratio of a number of the structural units derived from the epoxy group to a number of the structural units derived from the diamine compound having the aromatic skeleton or alicyclic skeleton is 5 to 20.

12. The polyurethane composition according to claim 1, wherein in each of the at least two different compounds (A-2), the ratio of a number of the structural units derived from the epoxy group to a number of the structural units derived from the diamine compound having the aromatic skeleton or alicyclic skeleton is 5 to 16.

* * * * *